United States Patent [19]
Salm

[11] 3,750,886
[45] Aug. 7, 1973

[54] APPARATUS FOR MAINTAINING THE POTABILITY OF CISTERN WATER

[76] Inventor: Gerlof Berthy Salm, 10 rue Grenus, 1201 Geneva, Switzerland

[22] Filed: June 30, 1971

[21] Appl. No.: 158,296

[52] U.S. Cl. ............................................. 210/111
[51] Int. Cl. ............................................. B01d 21/24
[58] Field of Search .................... 210/109, 111, 122

[56] References Cited
UNITED STATES PATENTS
441,739  12/1890  Blake ............................. 210/111 X
219,591  9/1879  Morgan ............................. 210/111

Primary Examiner—John Adee
Attorney—Mason, Kolehmainen, Rathburn & Wyss

[57] ABSTRACT

The present invention relates to an apparatus for maintaining the potability of cistern water operating automatically by means of the falling rain itself and having means for diverting the initial rainfall, which contains accumulated dirt, leaves, bird droppings, etc., to a sewer, drainage ditch, irrigation reservoir or the like, for a pre-determined period of time, after which the apparatus switches and conducts the rain water, now clean, to an underground cistern in the form of potable water.

3 Claims, 1 Drawing Figure

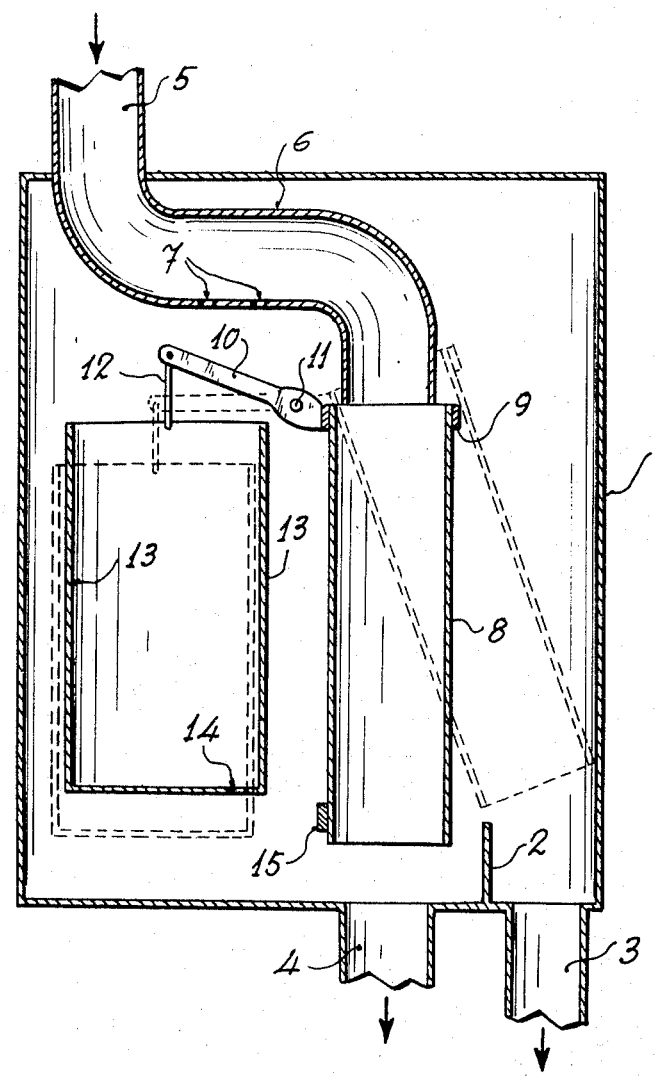

APPARATUS FOR MAINTAINING THE POTABILITY OF CISTERN WATER

In general terms, the said apparatus consists of an assymmetric balance, one of whose counterpoises is made up of a short tube, while the other, lighter in weight, is made up of a hanging receptacle which, when it begins to rain, receives a part of the rainfall and provides an increase in weight until an alternate imbalance occurs, after which the device swings, at which time the lower end of the tube is swung over the mouth of a conduit leading to a cistern, and the water caught by the gutters of the roof is thus directed and conducted through said conduit. However, until the alternate imbalance is reached, the lower end of the tube directs the rainwater only to the drainage means, this initial or normal position being recovered automatically after it stops raining.

This apparatus is to be connected to the piping which conducts rain water from a roof to an underground cistern in such a manner that the initial rainfall, which contains accumulated dirt, leaves, bird droppings, etc., is diverted to a sewer, drainage ditch or irrigation reservoir, etc., for a pre-determined period of time, after which the apparatus switches and conducts the rain water, now clean, to the cistern in the form of potable water.

One feature of this invention is that the said apparatus operates automatically by means of the falling rain itself. During dry weather, the diverting means of the apparatus always leads to the drainage facilities and will not permit any water to reach the cistern until after a certain quantity of rain has fallen, this quantity assuring that the roof has been properly flushed by the rain water.

Although this apparatus does not allow all the rainfall to reach the cistern, the initial amount of water is that which is needed to clean the roof, after which the rainwater reaching the cistern is not contaminated. Thus the need to clean the cistern frequently is eliminated, as well as the pollution of the stored water and the consequences thereof.

In general terms, the apparatus consists of an assymmetric balance, one of whose counterpoises is made up of a short tube, while the other, lighter in weight, is made up of a hanging receptacle which, when it begins to rain, receives a part of the rainfall and provides an increase in weight until an alternate imbalance occurs, after which the device swings, at which time the lower end of the tube is swung over the mouth of the conduit leading to the cistern, and the water caught by the gutters of the roof is thus directed and conducted through said conduit. However, until the alternate imbalance is reached, the lower end of the tube directs the rainwater only to the drainage facilities; and this initial or normal position will be recovered automatically after it stops raining.

To understand the operation of this apparatus and solely for purposes of illustration, drawings are attached in which a vertical cross-section of the invention is presented schematically.

In these illustrations, the component elements and principal parts are designated by the following nomenclature:

1. Housing
2. Barrier
3. Pipe to Cistern
4. Drain Pipe
5. Downspout
6. Horizontal Segment
7. Apertures
8. Tubular Counterpoise
9. Collar
10. Arm
11. Balance Fulcrum
12. Bail
13. Receptacle
14. Orifice
15. Stop Taken as a whole, the apparatus comprises a receptacle 1 of proper size and shape, within a box-shaped housing, the bottom of which is divided into two areas by a barrier 2, the lesser area being related to the pipe to the cistern 3, the greater area leading to the drain pipe 4.

The downspout 5 from the gutters enters the housing 1 through the top and by means of an ell bends into a short horizontal segment 6, which contains two or more apertures 7 on the lower side, the latter permitting the passage of a small part of the total water running through said segment, the latter terminating in a downward pointed ell located within the tubular counterpoise 8, which is supported at its upper end by a collar 9 joined to the arm 10, in turn supported by the balance fulcrum 11, a shaft whose ends are permanently attached to the walls of the housing 1.

At the swinging end of the arm 10 is hung a bail 12 from which the receptacle 13 is suspended, directly below the apertures 7, thereby said receptacle receiving the water discharged from said apertures, but in greater quantity than that which leaves through the orifice 14 at the bottom of said receptacle. Therefore, both the water which can drain through said orifice 14 and the water which can fill to overflowing said receptacle 13 fall freely into the larger area of the bottom of the housing 1 and hence into the drain pipe 4.

The normal position of the moving parts of the apparatus, assuming that the receptacle 13 is empty and therefore exerts less downward force than the tubular counterpoise 8, is shown by the solid lines. Thus said tubular counterpoise occupies a vertical position, determined by its contact against the stop 15, such that said counterpoise discharges directly into the drain pipe 4.

When it begins to rain, the initial rainwater is discharged through the drain pipe 4, but a portion of this water is diverted through the apertures 7 of the horizontal segment 6 and falls into the receptacle 13 which, as it receives a greater quantity of water than that which can discharge through the orifice 14, is filled little by little until it exerts more downward force than the tubular counterpoise 8 and upsets the initial imbalance of the asymmetric balance, tipping it to the position shown by the dashed lines and therefore diverting the water now clean arriving from the gutters through the downspout 5 and the horizontal segment 6, into the lesser area in the bottom of the receptacle 1 and hence into the pipe to cistern 3.

When it stops raining, there is no water to continue filling the receptacle 13, which therefore slowly drains through the orifice 14, exerts less downward force and permits the return of the tubular counterpoise 8 to its normal position, after which the apparatus remains ready to function again during the next period of rain.

I claim

1. An apparatus for keeping clean the rainwater conducted to a cistern of potable water comprising a box-shaped housing having a flat, horizontal bottom, a transverse barrier dividing said bottom into two areas including a smaller and a larger area, said smaller area connecting with a pipe to a cistern and said larger area connecting with a drainage means; the upper lateral part of the housing providing connecting means for connection to the downspout from the gutters of a roof, a double elbow extending from said connecting means within said housing a short horizontal segment between said elbows in the bottom part of which there are two or more apertures permitting the unobstructed passage of a certain quantity of water running through said segment, a tubular counterpoise mounted for swinging within the said housing between the smaller and larger areas, the end of the said segment terminated in a downward vertical direction and inserted loosely within the upper end of said counterpoise.

2. An apparatus for keeping clean the rainwater conducted to a cistern of potable water as defined in Claim 1 wherein the tubular counterpoise defines an asymmetric balance, one of whose counterpoises consists of a tube normally in a vertical position established by a stop at its lower end, said tube being located directly over the drain pipe, but during operation in an inclined position, maintaining its connection with the downspout, therefore diverting the rainwater into the smaller area of the bottom of the housing which connects to the pipe to the cistern.

3. An apparatus for keeping clean the rainwater conducted to a cistern of potable water as defined in Claim 1 including a collar on the upper end of the tubular counterpoise, a radially extended arm articulated on a tilting shaft fixed in the facing walls of the receptacle, which arm at its free end is suspended from a flange a vessel attached to the free end of said arm which constitutes the other weight of a tilting complex, which is situated immediately beneath the apertures of the horizontal segment and which receives water that emerges through the said apertures, a lower spillway in the bottom of said receptacle, which water emerging through said apertures is always a greater quantity that which can emerge through said spillway, which, similarly to that which may overflow from the vessel, falls freely on the larger area of the bottom of the housing that is connected with the channel leading to the drainpipe.

* * * * *